United States Patent
Chiu et al.

(10) Patent No.: US 12,339,455 B2
(45) Date of Patent: Jun. 24, 2025

(54) AUGMENTED REALITY DISPLAY DEVICE

(71) Applicant: Acer Incorporated, New Taipei (TW)

(72) Inventors: Yi-Jung Chiu, New Taipei (TW); Tsung-Wei Tu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 224 days.

(21) Appl. No.: 18/189,206

(22) Filed: Mar. 24, 2023

(65) Prior Publication Data
US 2024/0161420 A1    May 16, 2024

(30) Foreign Application Priority Data

Nov. 16, 2022 (TW) .................. 111143806

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2019/0041645 A1* | 2/2019 | Wu | G02B 6/132 |
| 2020/0041785 A1 | 2/2020 | Takagi et al. | |
| 2020/0348528 A1 | 11/2020 | Jamali et al. | |
| 2021/0223448 A1 | 7/2021 | Sato et al. | |
| 2022/0252885 A1* | 8/2022 | Wang | G02B 27/286 |
| 2024/0111159 A1* | 4/2024 | Yang | G02B 27/283 |

FOREIGN PATENT DOCUMENTS

| | | | | |
|---|---|---|---|---|
| CN | 110426847 | 11/2019 | | |
| CN | 112654902 | 4/2021 | | |
| CN | 112987310 | 6/2021 | | |
| JP | 2012151792 A | * 8/2012 | ........... | H04N 1/0306 |
| TW | 201626048 | 7/2016 | | |
| TW | 201643506 | 12/2016 | | |
| TW | 202223490 | 6/2022 | | |
| WO | WO-2020173180 A1 | * 9/2020 | ........... | G02B 13/002 |

* cited by examiner

*Primary Examiner* — Jwalant Amin
(74) *Attorney, Agent, or Firm* — JCIPRNET

(57) ABSTRACT

An augmented reality display device, used for wearing in front of an eye of a user, which includes an image source, a polarizer, a first wave plate, a transflective element, a first lens, a second wave plate, a reflective polarizer, a second lens, a light guiding unit, and a curved transflective film. The image source is used for emitting an image light beam. The polarizer, the first wave plate, the transflective element, the first lens, the second wave plate, the reflective polarizer, and the second lens are sequentially disposed on a path of the image light beam. The light guiding unit has a reflective surface. The curved transflective film is disposed on the light guiding unit. After being incident on the light guiding unit, the image light beam is sequentially reflected by the reflective surface and the curved transflective film to the eye of the user.

14 Claims, 3 Drawing Sheets

AUGMENTED REALITY DISPLAY DEVICE

CROSS-REFERENCE TO RELATED APPLICATION

This application claims the priority benefit of Taiwan application serial no. 111143806, filed on Nov. 16, 2022. The entirety of the above-mentioned patent application is hereby incorporated by reference herein and made a part of this specification.

BACKGROUND

Technical Field

The disclosure relates to a display device, and in particular, to an augmented reality display device.

Description of Related Art

In recent years, virtual reality (VR) display technology and augmented reality (AR) display technology have flourished, and there are various optical systems for head-mounted displays (HMDs). The current HMD has problems such as bulky size and vergence-accommodation conflict (VAC).

VAC is caused by the difference between the accommodation distance (or focal distance) of one eye and the vergence distance of both eyes, which causes confusion in the human brain and makes the user prone to dizziness. Both virtual reality display devices and augmented reality display devices have such a problem. This is especially true for augmented reality display devices, which use virtual images to interact with real objects. Therefore, how to design an optical solution that may overcome VAC and reduce the size of the HMD is still a problem to be solved.

SUMMARY

The disclosure provides an augmented reality display device, which may achieve favorable optical effects with a small volume.

An embodiment of the disclosure provides an augmented reality display device used for wearing in front of an eye of a user. The augmented reality display device includes an image source, a polarizer, a first wave plate, a transflective element, a first lens, a second wave plate, a reflective polarizer, a second lens, a light guiding unit, and a curved transflective film. The image source is used to emit an image light beam, and the polarizer is disposed on the path of the image light beam. The first wave plate is disposed on the path of the image light beam from the polarizer, and the transflective element is disposed on the path of the image light beam from the first wave plate. The first lens is disposed on the path of the image light beam from the transflective element, and the second wave plate is disposed on the path of the image light beam from the first lens. The reflective polarizer is disposed on the path of the image light beam from the second wave plate, and the second lens is disposed on the path of the image light beam from the reflective polarizer. The light guiding unit is disposed on the path of the image light beam from the second lens, in which the light guiding unit has a reflective surface. The curved transflective film is disposed on the light guiding unit, in which after being incident on the light guiding unit, the image light beam is sequentially reflected by the reflective surface and the curved transflective film to the eye of the user, and part of the light from the external object passes through the curved transflective film to the eye of the user.

In the augmented reality display device of the embodiment of the disclosure, due to the structure of the polarizer, the first wave plate, the transflective element, the first lens, the second wave plate, and the reflective polarizer being used, the image light beam may be returned twice between the transflective element and the reflective polarizer, thereby increasing the light path without enlarging the space occupied by the element. Therefore, the augmented reality display device of the embodiment of the disclosure may use a smaller space to achieve favorable optical effects.

DESCRIPTION OF THE EMBODIMENTS

Figure 1:
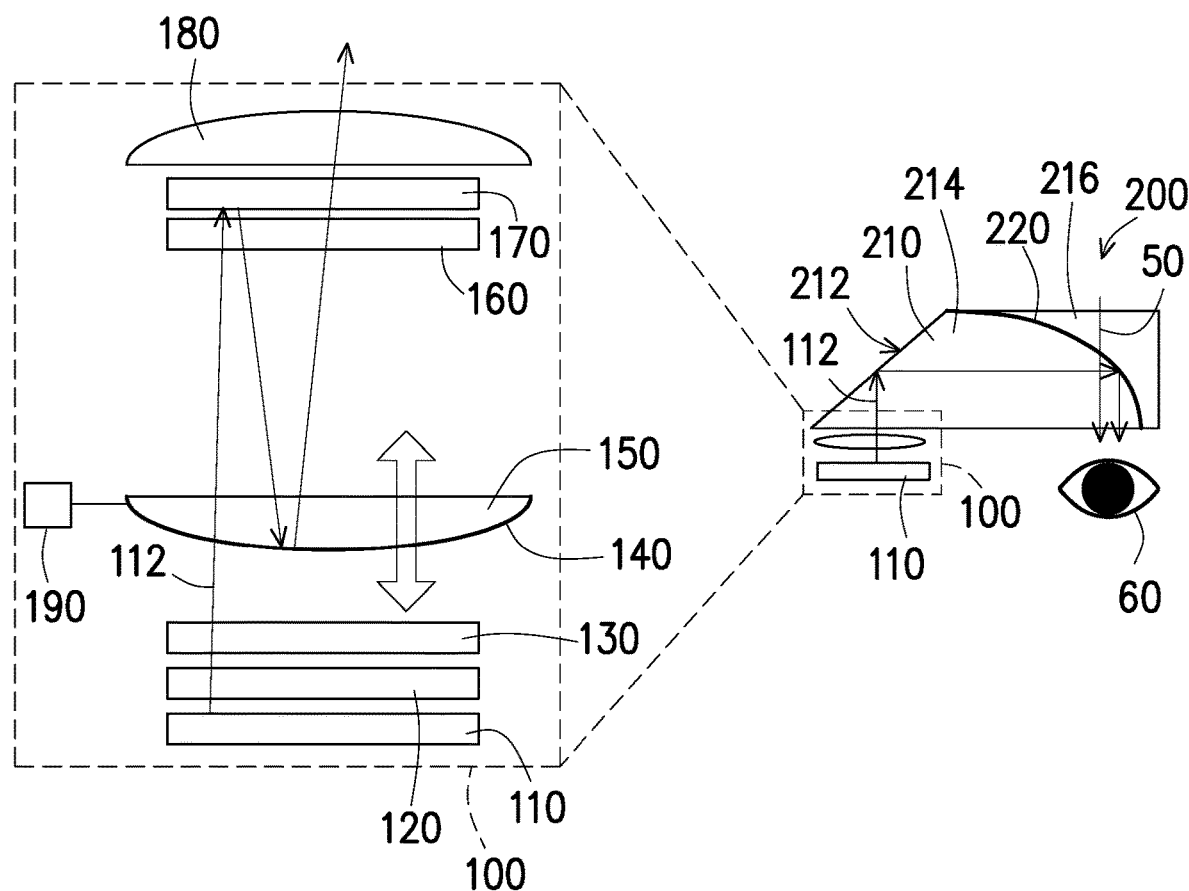
FIG. 1 is a schematic structural diagram of an augmented reality display device according to an embodiment of the disclosure.

FIG. 1 is a schematic structural diagram of an augmented reality display device according to an embodiment of the disclosure. Referring to FIG. 1, an augmented reality display device 200 of the embodiment is used for wearing in front of an eye 60 of a user. The augmented reality display device 200 includes an image source 110, a polarizer 120, a first wave plate 130, a transflective element 140, a first lens 150, a second wave plate 160, a reflective polarizer 170, a second lens 180, a light guiding unit 210, and a curved transflective film 220. The image source 110 is used for emitting an image light beam 112. In the embodiment, the image source 110 is a display panel. For example, the image source 110 is, for example, an organic light-emitting diode (OLED) display, a liquid crystal display, a liquid-crystal-on-silicon panel (a LCOS panel), a digital micro-mirror device (DMD), or other components that may provide the image light beam 112.

The polarizer 120 is disposed on the path of the image light beam 112. The first wave plate 130 is disposed on the path of the image light beam 112 from the polarizer 120, and the transflective element 140 is disposed on the path of the image light beam 112 from the first wave plate 130. The first lens 150 is disposed on the path of the image light beam 112 from the transflective element 140, and the second wave plate 160 is disposed on the path of the image light beam 112 from the first lens 150. The reflective polarizer 170 is disposed on the path of the image light beam 112 from the second wave plate 160, and the second lens 180 is disposed on the path of the image light beam 112 from the reflective polarizer 170.

In the embodiment, the polarizer 120 is, for example, a linear polarizer, and the transflective element 140 is a transflective film, disposed on the surface of the first lens 150 facing the first wave plate 130. In an embodiment, the transflective film is, for example, a semi-transflective film.

In the embodiment, both the first wave plate 130 and the second wave plate 160 are quarter wave plates. In the embodiment, the image light beam 112 has a first linear polarization direction after passing through the polarizer 120, and has a circular polarization direction after passing through the first wave plate 130 (i.e., the quarter wave plate). Then, part of the image light beam 112 passes through the transflective element 140 and the first lens 150, and has a second linear polarization direction after passing through the second wave plate 160. The reflective polarizer 170 (i.e. the reflective polarizer) is adapted to reflect the light with the second linear polarization direction, and is adapted to allow the light with the first linear polarization direction to pass through, so the reflective polarizer 170 reflects the image light beam 112 with the second linear polarization direction from the second wave plate 160. Next, the image light beam 112 with the second linear polarization direction has the circular polarization direction after passing through the second wave plate 160. Then, the image light beam 112 is reflected by the transflective element 140 after passing through the first lens 150, and passes through the first lens 150 before passing to the second wave plate 160 again. The image light beam 112 with the circular polarization direction has the first linear polarization direction after passing through the second wave plate 160. Therefore, the image light beam 112 with the first linear polarization direction then passes through the reflective polarizer 170 and is delivered to the second lens 180. In the embodiment, the first linear polarization direction is perpendicular to the second linear polarization direction. The image source 110, the polarizer 120, the first wave plate 130, the transflective element 140, the first lens 150, the second wave plate 160, the reflective polarizer 170, and the second lens 180 may form a projection module 100. The structure shown in the big box of the projection module 100 on the left of FIG. 1 is an enlarged view of the small box of the projection module 100 on the right of FIG. 1, which shows the detailed elements of the projection module 100 in detail.

The light guiding unit 210 is disposed on the path of the image light beam 112 from the second lens 180, in which the light guiding unit 210 has a reflective surface 212. The curved transflective film 220 is disposed on the light guiding unit 210, in which after being incident on the light guiding unit 210, the image light beam 112 is sequentially reflected by the reflective surface 212 and the curved transflective film 220 to the eye 60 of the user, so that the eye 60 of the user may see a virtual image in front of the light guiding unit 210. On the other hand, part of a light 50 from the external object passes through the curved transflective film 220 and is transmitted to the eye 60 of the user. In this way, the eye 60 of the user may simultaneously see the virtual image provided by the augmented reality display device 200 and the external object, thereby achieving the effect of augmented reality.

In the embodiment, the light guiding unit 210 is a light guiding column, and the curved transflective film 220 is sandwiched in the light guiding column. For example, the light guiding unit 210 includes a first light-transmitting portion 214 and a second light-transmitting portion 216, and the curved transflective film 220 is sandwiched between the first light-transmitting portion 214 and the second light-transmitting portion 216. In the embodiment, the concave surface of the curved transflective film 220 faces the eye 60. In an embodiment, the curved transflective film 220 is a semi-transflective film. In the embodiment, the reflective surface 212 may be a total reflective surface, or a reflective film may be provided on the reflective surface 212 to reflect the image light beam 112.

In the augmented reality display device 200 of the embodiment, due to the structure of the polarizer 120, the first wave plate 130, the transflective element 140, the first lens 150, the second wave plate 160, and the reflective polarizer 170 being used, the image light beam 112 may be returned twice between the transflective element 140 and the reflective polarizer 170. That is, the image light beam 112 may pass through the first lens 150 twice to greatly increase the magnification. In this way, the light path and magnification may be increased without enlarging the space occupied by the element. Therefore, the augmented reality display device 200 of the embodiment may use a smaller space to achieve favorable optical effects. For example, the virtual image provided by the augmented reality display device 200 may cover a larger field of view. In the embodiment, the first lens 150 and the second lens 180 are convex lenses, such as plano-convex lenses, but in other embodiments, they may also be other types of lenses, such as concave lenses. In addition, in other embodiments, the number of lens between the reflective element 140 and the reflective polarizer 170 may also be multiple. In another embodiment, multiple lenses may also be used instead of the second lens 180.

In the embodiment, the first lens 150 is used for moving between the first wave plate 130 and the second wave plate 160 to adjust the effective focal length of the first lens 150 and the second lens 180. The augmented reality display device 200 may further include an actuator 190 connected to the first lens 150 and used to drive the first lens 150 to move between the first wave plate 130 and the second wave plate 160. In an embodiment, the actuator 190 is, for example, a motor.

Figure 2:
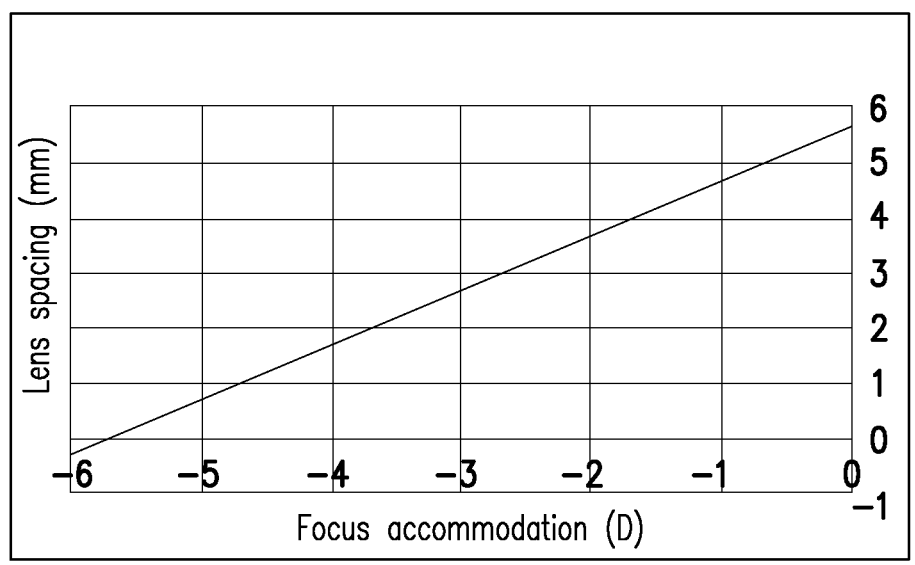
FIG. 2 is a diagram showing a relationship between a spacing of the first lens and the second lens in FIG. 1 and a focus accommodation of an augmented reality display device.

FIG. 2 is a diagram showing a relationship between a spacing of the first lens and the second lens in FIG. 1 and a focus accommodation of an augmented reality display device. Referring to to FIG. 1 and FIG. 2, the lens spacing of the vertical axis of FIG. 2 refers to the spacing between the first lens 150 and the second lens 180 in units of millimeters (mm), while the horizontal axis is the focus accommodation of the augmented reality display device in units of diopters (D).

TABLE 1

|  | Diopter | | | | | |
| --- | --- | --- | --- | --- | --- | --- |
|  | 0 D | −1 D | −2 D | −3 D | −4 D | −5 D |
| Virtual image position | ∞ | 1 m | 0.5 m | 0.33 m | 0.25 m | 0.2 m |
| Lens spacing | 5.65 mm | 4.67 mm | 3.67 mm | 2.67 mm | 1.67 mm | 0.70 mm |

Table 1 above shows the relationship among the lens spacing (that is, the spacing between the first lens 150 and the second lens 180), the position of the virtual image (that is, the distance in front of the eye 60 of the virtual image formed by the augmented reality display device 200), and the diopter of the augmented reality display device 200. It may be seen from Table 1 and FIG. 2 that the smaller is the lens spacing, the closer the virtual image is to the eye 60 and the smaller the diopter. In this way, the virtual image distance may be changed by appropriately adjusting the lens spacing. When the virtual image distance is consistent with the focal distance of the eye 60 (e.g., when the eye 60 focuses on the external object, the virtual image distance is adjusted to be consistent with the distance of the external object), VAC may be effectively improved.

Figure 3:
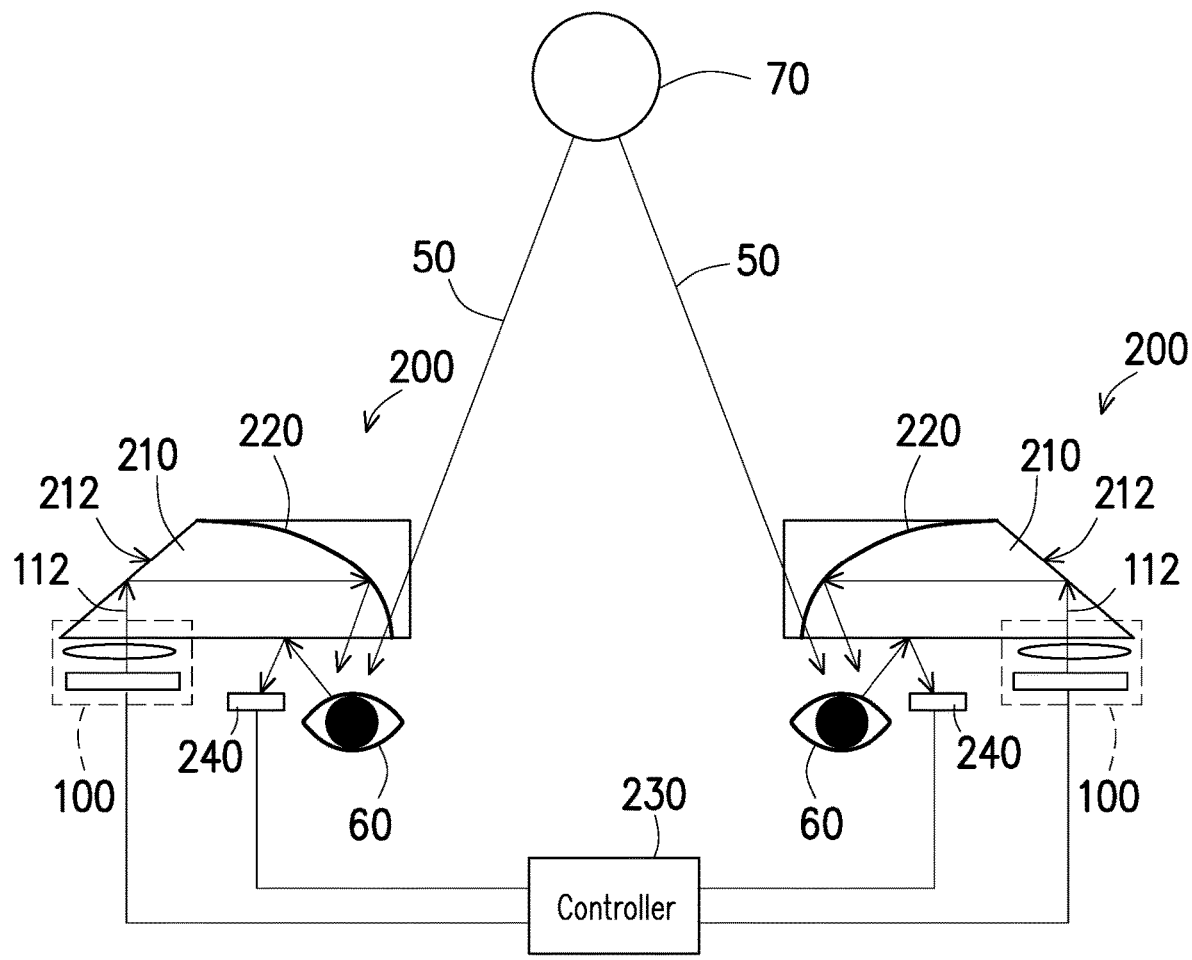
FIG. 3 is a schematic structural diagram of an augmented reality display device according to another embodiment of the disclosure.

FIG. 3 is a schematic structural diagram of an augmented reality display device according to another embodiment of the disclosure. Referring to FIG. 3, in actual use, the augmented reality display device 200 may be disposed in front of each of the two eyes 60 of the user, and the two augmented reality display devices 200 in front of both eyes may adopt the augmented reality display device 200 as shown in FIG. 1. In the embodiment, the augmented reality display device 200 further includes a camera 240 and a controller 230. The camera 240 is used for photographing the eye 60. The camera 240 may be an infrared camera or a visible light camera, and the light from the eye 60 may be directly transmitted to the camera 240, or transmitted to the camera 240 through reflection from the surface of the light guiding unit 210 as shown in FIG. 3.

The controller 230 is electrically connected to the camera 240, the image source 110 (as shown in FIG. 1), and the actuator 190 of the first lens 150 (as shown in FIG. 1), and is used for calculating the gaze point position of the eye 60 according to the image of the eye 60 photographed by the camera 240. Next, the controller 230 is used for determining the image content provided by the image source 110 according to the gaze point position, and commanding the actuator 190 to dynamically adjust the position of the first lens 150 according to the image content. In this way, the position of the virtual image provided by the augmented reality display device 200 may be dynamically adjusted to be the same as the gaze point position of the eye 60 so as to effectively improve VAC. For example, when the camera 240 detects that the eye 60 of the user is looking at an external object 70, the controller 230 may command the image source 110 and the actuator 190 to adjust, so that the virtual image formed by the augmented reality display device 200 also falls at the same distance from the object 70, so as to effectively resolve VAC.

In an embodiment, the controller 230 is, for example, a central processing unit (CPU), a microprocessor, a digital signal processor (DSP), a programmable controller, a programmable logic device (PLD), or other similar devices or a combination of these devices, and the disclosure does not limit. In addition, in an embodiment, each function of the controller 230 may be implemented as multiple program codes. The program codes are stored in a memory, and are executed by the controller 230. Alternatively, in an embodiment, each function of the controller 230 may be implemented as one or more circuits. The disclosure does not limit the implementation of each function of the controller 230 by means of software or hardware.

To sum up, in the augmented reality display device of the embodiment of the disclosure, due to the structure of the polarizer, the first wave plate, the transflective element, the first lens, the second wave plate, and the reflective polarizer being used, the image light beam may be returned twice between the transflective element and the reflective polarizer, thereby increasing the light path without enlarging the space occupied by the element. Therefore, the augmented reality display device of the embodiment of the disclosure may use a smaller space to achieve favorable optical effects.

What is claimed is:

1. An augmented reality display device, used for wearing in front of an eye of a user, wherein the augmented reality display device comprises:

an image source, used for emitting an image light beam;
a polarizer, disposed on a path of the image light beam;
a first wave plate, disposed on a path of the image light beam from the polarizer;
a transflective element, disposed on a path of the image light beam from the first wave plate;
a first lens, disposed on a path of the image light beam from the transflective element;
a second wave plate, disposed on a path of the image light beam from the first lens;
a reflective polarizer, disposed on a path of the image light beam from the second wave plate;
a second lens, disposed on a path of the image light beam from the reflective polarizer;
a light guiding unit, disposed on a path of the image light beam from the second lens, wherein the light guiding unit has a reflective surface; and
a curved transflective film, disposed on the light guiding unit, wherein after being incident on the light guiding unit, the image light beam is sequentially reflected by the reflective surface and the curved transflective film to the eye of the user, and a part of a light from an external object passes through the curved transflective film and is transmitted to the eye of the user.

2. The augmented reality display device according to claim 1, wherein the transflective element is a transflective film, disposed on a surface of the first lens facing the first wave plate.

3. The augmented reality display device according to claim 2, wherein the transflective film is a semi-transflective film.

4. The augmented reality display device according to claim 1, wherein the first lens is used for moving between the first wave plate and the second wave plate to adjust an effective focal length of the first lens and the second lens.

5. The augmented reality display device according to claim 1, wherein both the first wave plate and the second wave plate are quarter wave plates.

6. The augmented reality display device according to claim 1, further comprising:

a camera, used for photographing the eye; and
a controller, electrically connected to the camera, the image source, and an actuator of the first lens, and used for calculating a gaze point position of the eye according to an image of the eye photographed by the camera, wherein the controller is used for determining an image content provided by the image source according to the gaze point position, and commanding the actuator to dynamically adjust a position of the first lens according to the image content.

7. The augmented reality display device according to claim 1, wherein the light guiding unit is a light guiding column, and the curved transflective film is sandwiched in the light guiding column.

8. The augmented reality display device according to claim 1, wherein a concave surface of the curved transflective film faces the eye.

9. The augmented reality display device according to claim 1, wherein the curved transflective film is a semi-transflective film.

10. The augmented reality display device according to claim 1, wherein the image source is a display panel.

11. The augmented reality display device according to claim 10, wherein the image source 110 is an organic light-emitting diode display, a liquid crystal display, a liquid-crystal-on-silicon panel, or a digital micro-mirror device.

12. The augmented reality display device according to claim 1, wherein the polarizer is a linear polarizer.

13. The augmented reality display device according to claim 1, wherein the image light beam has a first linear polarization direction after passing through the polarizer, and has a circular polarization direction after passing through the first wave plate.

14. The augmented reality display device according to claim 13, wherein a part of the image light beam passes through the transflective element and the first lens, and has a second linear polarization direction after passing through the second wave plate.

\* \* \* \* \*